United States Patent Office 3,416,325
Patented Dec. 17, 1968

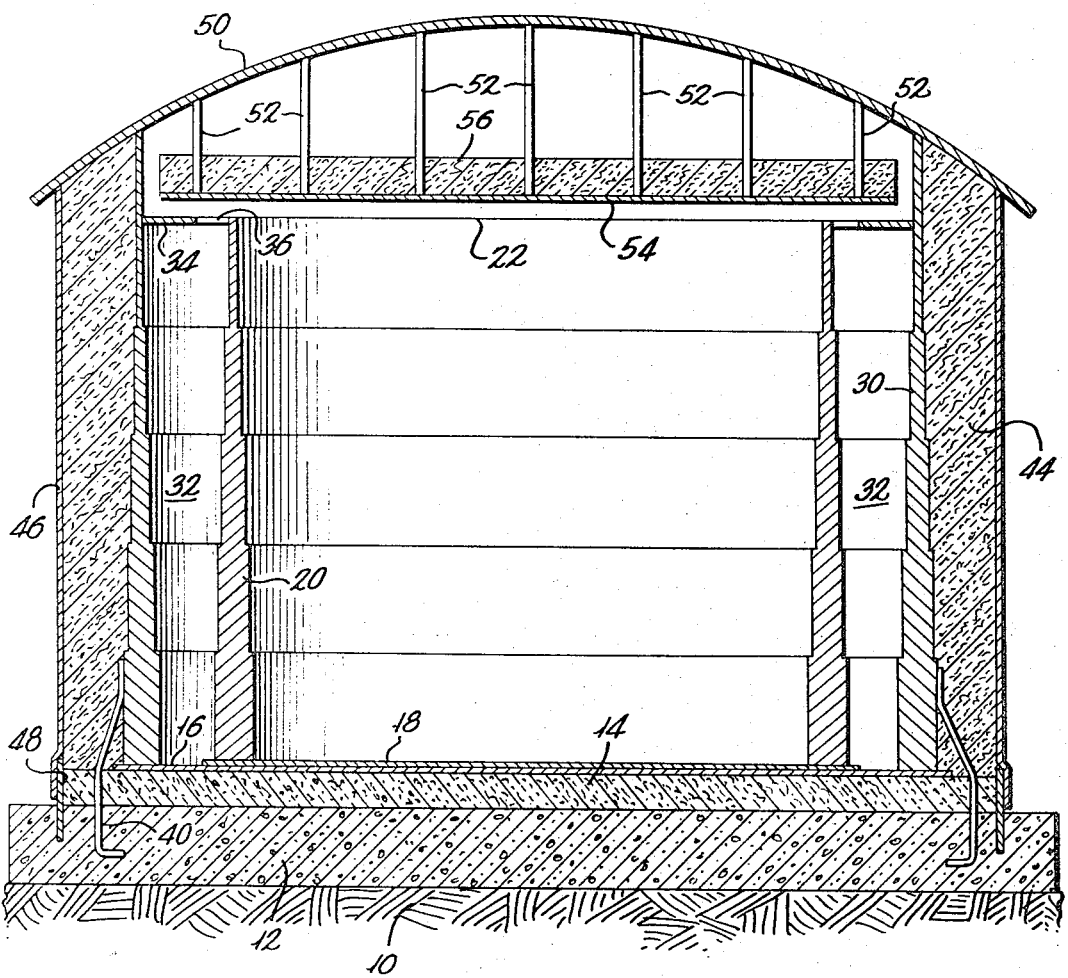

3,416,325
LOW TEMPERATURE STORAGE TANK
Ardell H. Nelson, Coraopolis, Pa., assignor to Pittsburgh-Des Moines Steel Company, Pittsburgh, Pa., a corporation of Pennsylvania
Filed June 9, 1967, Ser. No. 645,018
10 Claims. (Cl. 62—45)

ABSTRACT OF THE DISCLOSURE

A low temperature storage tank includes a base portion comprising a foundation portion supporting an insulating layer which in turn supports an outer tank bottom plate which further supports an inner tank bottom plate. An inner cylindrical wall means extends upwardly from the inner tank bottom plate and defines an inner tank open at the top thereof. An outer wall means of generally cylindrical configuration extends upwardly from said outer tank bottom plate and is disposed concentrically about the inner wall means. An open area is defined between the inner and outer wall means, the upper open end of the inner tank being in communication with the upper portion of the open area between the inner and outer wall means. Anchor straps are secured to the outer surface of the outer wall means and extend downwardly and are embedded within a foundation portion. Insulating means is disposed in surrounding relationship to the outer wall means, and a moisture barrier means is disposed in surrounding relationship to the insulating means. Roof means is supported by the outer wall means and includes a suspended inner roof portion which is insulated and which is spaced from the inner and outer wall means.

Background of the invention

The present invention relates to an insulated storage tank for storing liquids at temperatures of +32° F. or lower, and includes safety features to prevent rupture or failure of the tank.

It is often desirable and advantageous to store normally gaseous elements such as hydrocarbons and the like in a liquefied state at pressures at or near the boiling point of the liquid. By storing such gases in the liquid phase, the volume is greatly reduced thus reducing the size of the storage tank required. These tanks are often used near populated areas or to property which would be endangered if failure of the tank should occur.

In a typical example, propane may be stored at its liquid boiling point of −44° F. wherein it has a gas-to-liquid volume ratio of approximately 318. An insulated tank is of course required to store such extremely cold liquid. In the prior art, storage tanks have been employed including an inner vessel designed to contain the liquefied gas and to withstand the pressures of the insulating material acting against the outer surface of such inner vessel. Insulating material is disposed in surrounding relationship to the inner vessel, and an insulating protection barrier is disposed about the insulation, this barrier being designed to withstand the pressure of the insulating material acting against the inner surface thereof. This outer protection barrier is not normally designed to contain a stored product, and if the inner vessel should rupture, the outer insulating jacket will also fail.

In order to overcome the shortcomings of a storage tank of the construction described above, the outer vessel disposed about the insulating material has also been designed to contain the stored product. Since this outer vessel is separated from the inner vessel by insulating material, the outer vessel is at ambient temperature, while the inner vessel is at the temperature of the stored product.

Under these conditions, if the inner vessel ruptures, a very large quantity of the cold liquid rapidly vaporizes when it comes in contact with the warm outer vessel and the insulation adjacent thereto. This instantaneous release of vapor may often exceed the safe venting capacity of the outer vessel whereby rupture of the outer vessel also occurs. Additionally, the outer vessel may fail due to thermal shock caused by the instantaneous cooling of the outer shell from ambient temperature to that of the stored product as the cold liquid from a ruptured inner vessel comes in contact with the outer vessel. Accordingly, in a double wall tank construction wherein the outer vessel is designed as a liquid containing structure, no greater safety is actually obtained than in an arrangement wherein the outer vessel simply comprises a protective layer for the insulation surrounding the inner vessel.

Since a liquid containing shell is very expensive as compared with an insulating jacket, it is evident that the double wall tank construction as described hereinabove including a pair of vessels designed to contain the stored product represents a costly construction which is no safer than the less expensive contructions including a single liquid containing vessel.

Summary of the invention

The present invention includes an arrangement wherein inner and outer wall means are provided each of which is of a construction to contain the stored liquid. The outer wall means is disposed in surrounding spaced relationship to the inner wall means so as to provide an open area therebetween. The upper portion of the inner tank defined by the inner wall means is in communication with the open area between the inner and outer wall means so that the outer wall means will be maintained at substantially the same temperature as the inner wall means. This outer wall means is in turn surrounded by insulating material which is further surrounded by a moisture barrier means.

If the inner wall means should rupture, the liquid escaping therefrom will come into contact with the outer wall means which is at substantially the same temperature as the inner wall means. Since there is no substantial temperature difference, the liquid will not vaporize, and there is no significant thermal shock to the outer wall means, whereby the outer wall means will not rupture or fail as has been the case with the prior art arrangements discussed hereinabove.

Additionally, since the inner wall means is spaced from the outer wall means, an open area is afforded within which personnel can move about to readily inspect the inner and outer wall means while the tank is in service. Additionally, the inner and outer wall means may be readily maintained without removing the insulating material disposed in surrounding relationship to the outer wall means. This is not possible with the aforementioned prior art arrangements.

An object of the present invention is to provide a new and novel low temperature storage tank including inner and outer wall means adapted to contain a low temperature liquid product wherein the outer wall means is maintained at substantially the same temperature as the inner wall means and the product stored therein, and wherein the wall means may be readily inspected and maintained.

Brief description of the drawing

The drawing illustrates a vertical section through a low temperature storage tank according to the present invention.

Description of the preferred embodiment

Referring now to the drawing, a suitable support surface such as the ground is indicated by reference numeral 10, the ground serving to support a foundation portion 12 which may be formed of a suitable material such as concrete or the like. A body of insulating material 14 is supported by the foundation portion 12, and may comprise a suitable load bearing insulating material such as foamed glass or the like.

An outer tank bottom plate 16 is supported by the body of insulating material 14, and an inner tank bottom plate 18 is in turn supported on the outer tank bottom plate 16. These tank bottom plates as well as the wall means hereinafter described may be formed of a suitable strong rigid material such as steel or the like.

An inner wall means 20 of generally cylindrical configuration is secured as by welding at the lower end thereof to the inner tank bottom plate 18 and extends upwardly therefrom. This inner wall means is of stepped cross sectional configuration so as to provide adequate strength to various portions of the wall means for supporting stored liquid therewithin, as is conventional in the art. The upper end 22 of the inner wall means is open and spaced below the inner roof portion hereinafter described.

An outer wall means 30 which is also of generally cylindrical configuration is disposed in concentric spaced relationship to the inner wall means 20, the lower end of outer wall means 30 being suitably secured as by welding to the outer tank bottom plate 16 and extending vertically upwardly therefrom.

An open annular area 32 is defined between the inner and outer wall means 20 and 30 respectively. An annular plate 34 is secured as by welding to the inner surface of outer wall means 32 and projects radially inwardly therefrom. The inner edge of plate 34 is spaced from the outer surface of the inner wall means 20 so as to define an annular space 36 therebetween. Accordingly, the open upper end of the inner tank defined by inner wall means 20 is in communication with the upper portion of the open area 32 through space 36.

A plurality of anchor members 40 in the form of steel straps or the like are provided, these anchor members being spaced about the tank. The upper ends of anchor members 40 are suitably secured as by welding to the outer surface of the outer wall means 30, while the lower ends of anchor members 40 are embedded within the material of the foundation portion 12.

A body of insulating material 44 is disposed in surrounding contacting relationship to the outer surface of the outer wall means 30 and extends throughout the height thereof. This body of insulation may comprise fiberglass, polyurethane or any other suitable insulating material.

The body of insulating material 44 is in turn surrounded by a moisture barrier means 46 which may be in the form of a thin jacket of aluminum or steel and the like. The lower end of jacket 46 overlaps the upper end of an annular member 48 of similar material, the lower end of member 48 being embedded within the foundation portion 12.

The roof means for closing off the upper end of the storage tank includes a dome-shaped roof 50 having a plurality of spaced suspension rods 52 extending downwardly from the undersurface thereof and serving to support a flat inner roof plate 54 which is spaced above the upper end of the inner wall means 22 and also above annular plate 34. It will also be noted that the inner roof portion 54 is spaced radially inwardly of the uppermost portion of the outer wall means 30.

A body of insulating material 56 is supported on the upper surface of the inner roof portion 54, this body of insulation being of any suitable insulating material such as that employed in the body 44 previously described.

While a suspended ceiling type roof means has been illustrated and described, it should be understood that a conventional double dome roof design may also be employed in the low temperature storage tank of the present invention, just as long as the roof means affords a space whereby communication may be provided between the open upper end of the inner tank defined by the inner wall means and the open area between the inner and outer wall means.

It should also be understood that conventional vent means is provided for venting excess vapor under pressure within the tank.

In operation, it is apparent that gas within the upper portion of the inner tank defined by the inner wall means and which is of course disposed above the liquid level within this inner tank will circulate through opening 36 into the space 32 to cool the outer wall means 30 and to maintain it at substantially the same temperature as the inner wall means, whereby any failure or rupture of the inner wall means will not cause failure of the tank since the outer wall means is adapted to contain the liquid within the tank. It will also be noted that personnel can move about within the space 32 to inspect the tank walls while the tank is in service, suitable access means being provided to this space.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A low temperature storage tank comprising a base portion, imperforate inner wall means supported by said base portion and defining an inner tank, imperforate outer wall means spaced outwardly of said inner wall means and defining an open area between said inner wall means and said outer wall means, said outer wall means extending vertically throughout the vertical extent of said inner wall means so that said outer wall means is adapted to contain stored liquid in the event of failure of any portion of said inner wall means, means providing communication between the upper portion of said inner tank and said open area between the inner and outer wall means so that said outer wall means will be maintained at a low temperature, insulating means surrounding said outer wall means and roof means closing off the upper end of the low temperature storage tank.

2. Apparatus as defined in claim 1 wherein said inner wall means is spaced from said roof means and defines an inner tank open at the top, the open upper end of said inner tank being in communication with the upper portion of the open area between said inner and outer wall means.

3. Apparatus as defined in claim 1 wherein said inner wall means is of generally cylindrical configuration, said outer wall means also being of generally cylindrical configuration, said inner and outer wall means being in generally concentric relationship with one another.

4. Apparatus as defined in claim 1 wherein said base portion includes an outer tank wall, said outer wall means extending upwardly from said outer tank bottom, an inner tank wall supported by said outer tank bottom, said inner wall means extending upwardly from said inner tank bottom, and insulating means being disposed beneath said outer tank bottom of the base portion.

5. Apparatus as defined in claim 1 wherein the insulating means surrounding said outer wall means is in contact therewith throughout the outer periphery of the outer wall means, said insulating means extending from a point adjacent said base portion to a point adjacent said roof means.

6. Apparatus as defined in claim 5 wherein said insulating means is surrounded by a moisture barrier means extending throughout substantially the entire height of said insulating means.

7. Apparatus as defined in claim 1 including anchor means secured to said outer wall means, said anchor means extending downwardly within and being interconnected with said base portion for anchoring said outer wall means to said base portion.

8. Apparatus as defined in claim 1 wherein said roof means includes an inner roof portion suspended from said roof means and said inner roof portion being provided with insulating means.

9. Apparatus as defined in claim 8 wherein said inner roof portion is spaced from both said inner wall means and said outer wall means.

10. A low temperature storage tank comprising a base portion, inner wall means supported by said base portion and defining an inner tank, outer wall means spaced outwardly of said inner wall means and defining an open area between said inner wall means and said outer wall means, means providing communication between the upper portion of said inner tank and said open area between the inner and outer wall means so that said outer wall means will be maintained at a low temperature, insulating means surrounding said outer wall means and roof means closing off the upper end of the low temperature storage tank, said base portion including an outer tank bottom, said outer wall means extending upwardly from said outer tank bottom, an inner tank wall supported by said outer tank bottom, said inner wall means extending upwardly from said inner tank bottom, insulating means being disposed beneath said outer tank bottom, a foundation portion supporting said insulating means, said inner wall means being of generally cylindrical configuration and defining an inner tank which is open at the top thereof, said inner wall means being spaced from said roof means, said outer wall means being of generally cylindrical configuration and being disposed in substantially concentric relationship with said inner wall means, the upper portion of said inner tank being in communication with the upper portion of the open area between said inner and outer wall means, the insulating means surrounding said outer wall means being in contact therewith, a moisture barrier means being disposed in surrounding relationship to said insulating means, anchor means secured to said outer wall means and extending downwardly and being secured in said foundation portion of the base portion, said roof means including an inner roof portion suspended from the roof means and being insulated, said inner roof portion being spaced from both said inner wall means and said outer wall means.

References Cited

UNITED STATES PATENTS

| 3,276,213 | 10/1966 | Soesan | 62—45 |
| 3,298,185 | 1/1967 | Loudon | 62—45 X |
| 3,306,058 | 2/1967 | Keilin | 62—45 |
| 3,326,011 | 6/1967 | Sparling | 62—45 |

LLOYD L. KING, *Primary Examiner.*

U.S. Cl. X.R.

62—260